United States Patent
Gloudeman et al.

(10) Patent No.: US 6,240,326 B1
(45) Date of Patent: May 29, 2001

(54) LANGUAGE INDEPENDENT BUILDING AUTOMATION ARCHITECTURE FOR WORLDWIDE SYSTEM DEPLOYMENT

(75) Inventors: Jeffrey J. Gloudeman, Franklin; Donald A. Gottschalk, Wauwatosa; David E. Rasmussen, Dousman, all of WI (US)

(73) Assignee: Johnson Controls Technology Co., Plymouth, MI (US)

( * ) Notice: Subject to any disclaimer, the term of this patent is extended or adjusted under 35 U.S.C. 154(b) by 0 days.

(21) Appl. No.: 09/054,736

(22) Filed: Apr. 3, 1998

(51) Int. Cl.[7] .................................................. G05B 15/00
(52) U.S. Cl. ........................ 700/83; 700/275; 700/276
(58) Field of Search ................................. 700/83, 276, 9, 700/275, 131, 277, 180; 345/349, 112; 340/825.22, 523, 525

(56) References Cited

U.S. PATENT DOCUMENTS

| | | | |
|---|---|---|---|
| 4,731,735 | * 3/1988 | Borgendale et al. | 707/4 |
| 4,791,587 | * 12/1988 | Doi | 704/2 |
| 5,061,916 | * 10/1991 | French et al. | 340/522 |
| 5,426,421 | * 6/1995 | Gray | 700/223 |
| 5,621,662 | * 4/1997 | Humphries et al. | 700/276 |
| 5,659,337 | * 8/1997 | Tanaka et al. | 345/516 |
| 5,801,940 | * 9/1998 | Russ et al. | 700/9 |
| 5,828,992 | * 10/1998 | Kusmierczyk | 704/8 |
| 5,944,790 | * 8/1999 | Levy | 709/218 |
| 6,085,120 | * 7/2000 | Schwerdtfeger et al. | 700/90 |

* cited by examiner

Primary Examiner—William Grant
Assistant Examiner—Kidest Bahta
(74) Attorney, Agent, or Firm—Quarles & Brady; George E. Haas (57) ABSTRACT

A computer-implemented building automation operating system for supporting applications that interact with building automation devices in different locations. A computer-human interface is provided for viewing data related to the applications. A master name data structure stores global identifiers and location specific names for each of the applications that interact with the building automation devices. The global identifiers uniquely identify the applications. A building automation master name processor is connected to the master name data structure and to the computer-human interface for providing to the computer-human interface a location specific name based upon its associated global identifier. These features significantly enhance the global distribution and use of new building automation software applications.

13 Claims, 6 Drawing Sheets

LANGUAGE INDEPENDENT BUILDING AUTOMATION ARCHITECTURE FOR WORLDWIDE SYSTEM DEPLOYMENT

BACKGROUND AND SUMMARY OF THE INVENTION

The present invention relates generally to building automation systems. More particularly, the invention relates to a computer system and object-oriented software architecture with support embedded at the object level for different natural languages.

Sophisticated building automation systems have become quite complex. Such systems now integrate various control aspects of building automation subsystems that were once separate entities. For example, sophisticated building automation systems today control not only heating and cooling (HVAC), building entry, lighting, burglar and fire alarm, and the like, but even more sophisticated applications such as smoke evacuation systems that integrate formerly separate fire alarm, sprinkler systems and air handling systems.

To achieve economies of scale it is highly desirable that these building automation systems should be capable of deployment throughout the world, notwithstanding that different regions of the world speak different natural languages and practice different customs that can impact building automation and building management.

Conventionally, building automation system designers have had to build different versions of their products to support different natural languages. The conventional approach is to construct different user interface screens, dialog boxes and menus for each natural language supported. This requires considerable additional programming effort and makes distributing and supporting the product more difficult. The problem is compounded when system modifications or upgrades are introduced, as each different version requires an independent upgrade effort.

The present invention addresses the problem of worldwide distribution through an object-oriented architecture that defines a plurality of standard objects from which more complex and sophisticated applications are constructed. The standard objects embed basic physical world attributes and methods that are common to a family of building automation applications regardless of where in the world those applications are deployed.

The invention includes a master name dictionary or lexicon indexed to attributes in these standard objects, so that language can be specified once and the objects are then instantiated to use terminology corresponding to the selected language. Separating the functional aspects of the system from the user interface results in a great deal of flexibility and it virtually eliminates the need to develop independent versions of an application for different parts of the world. Moreover, maintaining and troubleshooting the applications is greatly simplified in that all language versions of the application are instantiated from the same model and hence exhibit the same behavior.

For a more complete understanding of the invention, its objects and advantages, reference may be had to the following specification and to the accompanying drawings.

BRIEF DESCRIPTION OF THE DRAWINGS

The accompanying drawings, which are incorporated in and constitute part of the specification, illustrate an embodiment of the present invention and together, with the description, serve to explain the principles of the invention. In the drawings, the same reference numeral indicates the same parts.

DESCRIPTION OF THE PREFERRED EMBODIMENT

The present invention provides a software system architecture that allows software engineers to more readily build modular, portable building automation applications. The software system of the invention is based on a distributed application component model that includes object-oriented constructs for performing a range of services used to construct more complex building automation applications. These services are performed by independent and decoupled objects that the application engineer may assemble in numerous ways to build complex building automation applications.

Aside from the flexibility and portability achieved by the object-oriented approach, the system architecture saves the engineer considerable time, by allowing new modules to be constructed without the need to re-compile the entire system. This greatly shortens the development time and simplifies the debugging process. Also, due to the top-to-bottom consistency of the distributed application component model, software modules can be deployed in a distributed way. Thus, the required functions and services needed in a complex system do not all need to reside in the same code or even on the same hardware components.

The invention achieves its modularity through a superclass design that enforces consistency. Desirably, all objects in the system inherit their properties from the superclass object specification.

The superclass object has a number of features that allow the system to achieve the above objectives. The superclass object specification defines a class called views that enables user interface devices (person machine interface devices) to display information about the object. In the building automation industry this is not a trivial matter, for there is rarely much uniformity in the types of person machine interface devices found in the field, and the software engineer cannot assume that the device will have any knowledge of a particular object's display requirements.

The superclass object specification also defines a command properties that tells what operations a particular object is able to perform. Again, in the building automation industry, the software engineer cannot assume that the hardware and software systems in the field will have any understanding of what operations a given object may perform.

Thus the superclass object architecture defines a self-descriptive, metadata definition; and perhaps more importantly, a mechanism by which these metadata are communicated to other components of the system. In effect, the superclass object specification, from which all application components are derived by inheritance, carries with it the mechanism needed for other system components (and other application objects) to view the objects data and exercise the objects commands.

Figure 1:
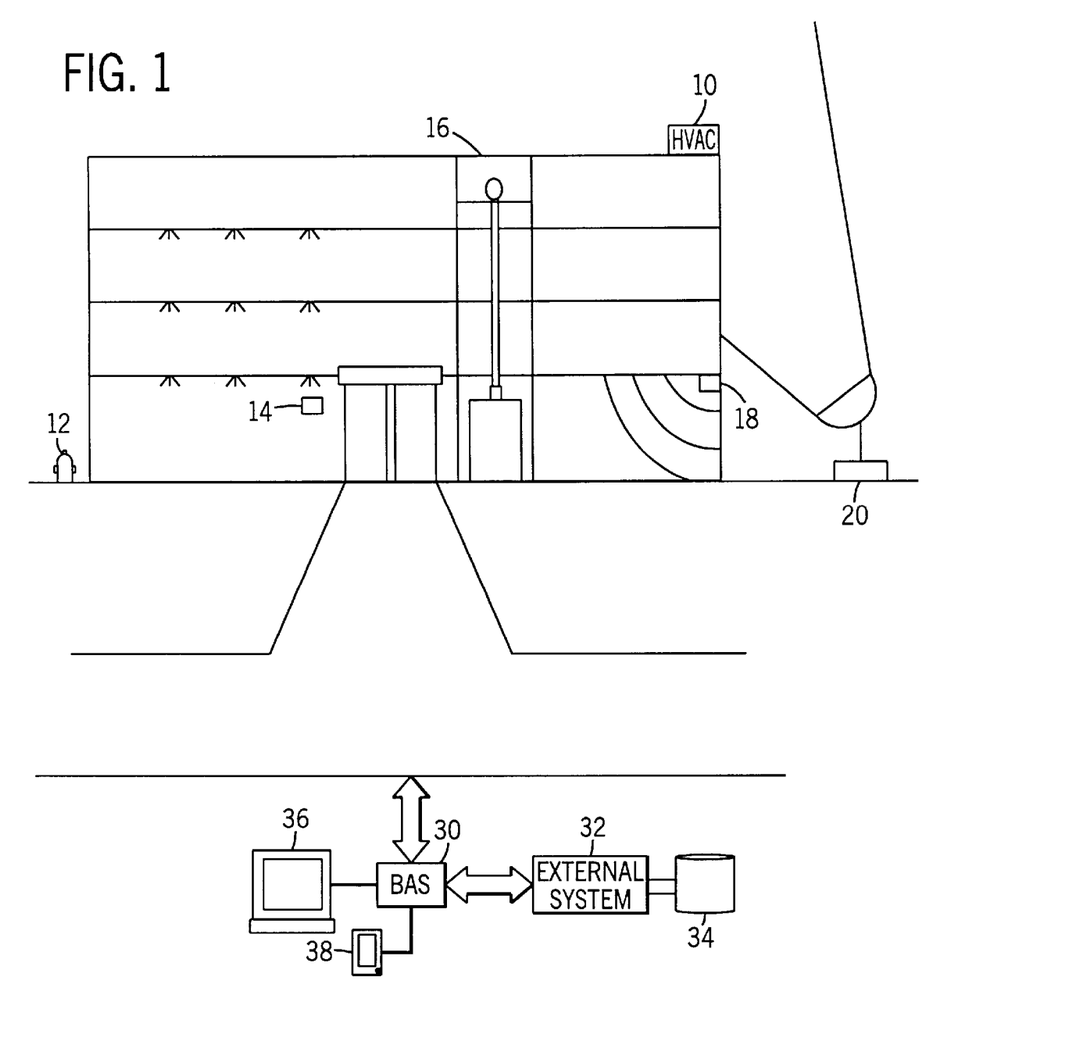
FIG. 1 is a diagrammatic view of a building environment, illustrating the building automation system of the invention in an exemplary application.

The building automation system of the invention provides a computer hardware ;and software architecture that supports powerful object-oriented system development. The building automation system can be used to monitor, collect data and control a multitude of different facilities management devices and applications. By way of illustration, FIG. 1 shows an exemplary facilities management application within a building that includes a heating and cooling system 10, fire alarms and sprinkler system 12, security system 14, elevator control system 16, intrusion alert system 18 and lighting control system 20. Although not explicitly illustrated, the exemplary facilities management application will typically also include such other building system services as sewer and water, waste management, landscape irrigation and maintenance, parking lot and sidewalk maintenance, and physical plant inventory control.

The building automation system 30 which uses the invention is designed to electronically communicate with the aforementioned building systems, either by direct hardwire connection or through wireless communication; or, by accessing information stored in data files maintained by other systems within the facility. As an example of the latter, the building might have an existing heating and air-conditioning (HVAC) system that must be integrated into the system of the present invention. Such an external system, illustrated at 32, can be readily connected to the building automated system 30 through the third party interface provided by the building automated system 30, as described more fully below. The external system 32 may include its own information storage component such as database 34.

The building automation system 30 also provides an Information Layer interface through which the human operator can interact with the building automation system through a variety of different user interfaces. To illustrate some of the possible interfaces, a monitor 36 and a personal digital assistant (PDA) 38 have been illustrated. These user interface devices can be connected to the building automation system by wire, wireless communication, local area network (LAN), wide area network (WAN), or through some other suitable communication lengths such as a telephone connection or the Internet.

Figure 2:
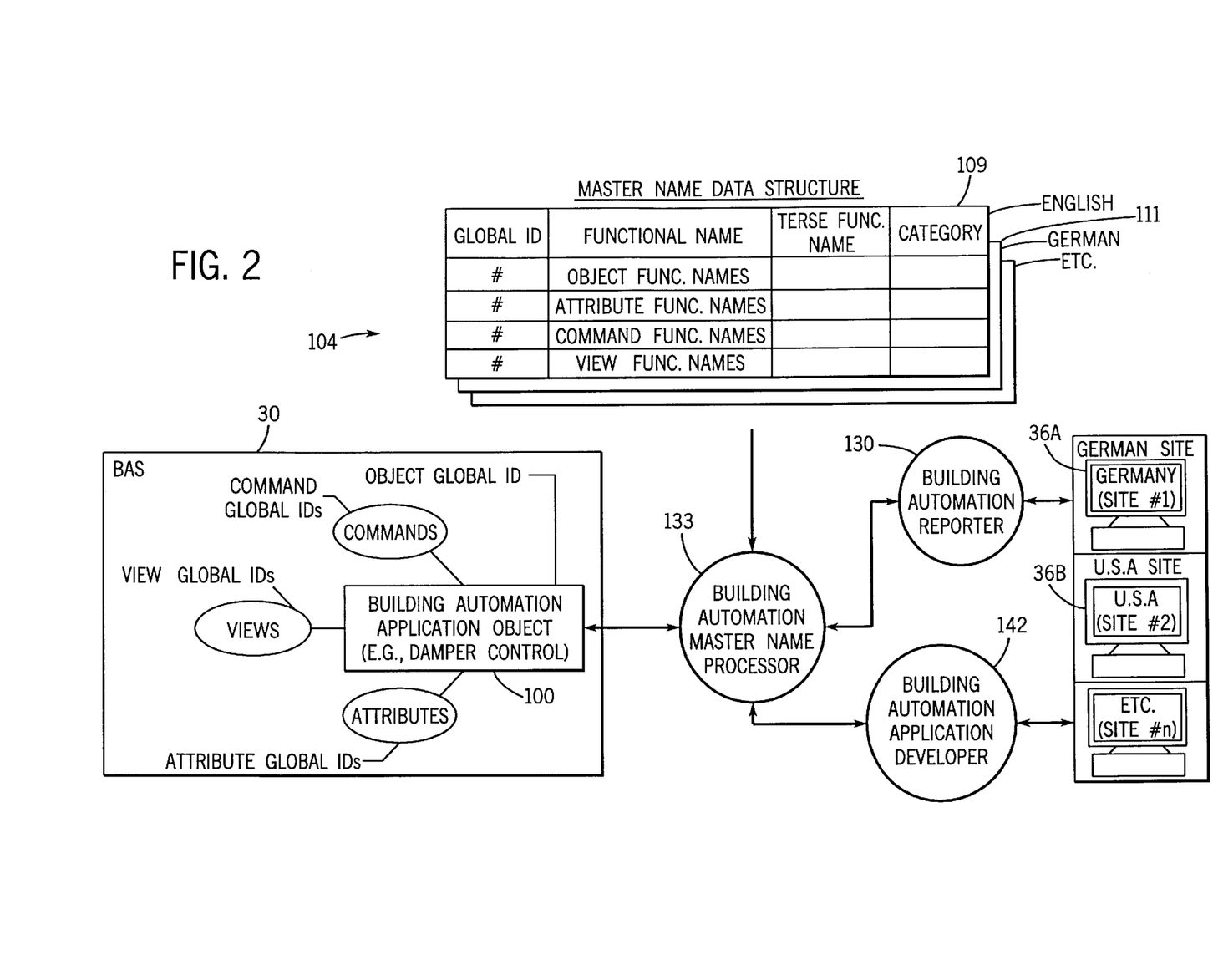
FIG. 2 is a data flow diagram depicting the flow of data to convert text from one location specific context to another location specific context.

FIG. 2 depicts monitors in different countries displaying to users the same building automation information in the language particular to the country of the user. For example, the present invention allows a German user to view system objects and attributes in the German language even if the application (such as building automation application 100) was created on a tool that used the English language. Monitor 36A is connected to the present invention to provide these features to the German user.

A user located at a site in the United States can still view the same information from the building automation applications as the German user. Monitor 36B is connected to the present invention to provide these features to the user in the United States.

These applications (such as building automation application 100) have pre-defined standard functional names. Functional names describe items in the system by their function. Functional names are preferably maintained in a master name data structure 104. The master name data structure 104 associates with the functional name a unique global identifier as well as preferably a more terse functional name and a category id.

In the preferred embodiment, the functional name is twenty characters in length. The terse functional name is eight characters in length. The global identifier and category identifier are integers. All product, system, and application naming adheres to the data maintained in the master name data structure 104.

The master name data structure 104 contains functional names for each language of interest. For example, a master name data structure 109 is provided to link American English functional names with global identifiers. American English master name data structure 109 is utilized by the user in the United States to view the building automation data for example of building automation application object 100. Master name data structure 111 is provided to link German functional names with global identifiers. German master name data structure 111 is utilized by the user in Germany to view the building automation data for example of building automation application object 100. Additional master name data structures exist for other languages such as Korean or French.

While the functional names in the master name data structures 109 and 111 may differ in that they are expressed in a particular language, the global identifiers associated with the functional names are the same. For example, a damper control application object has an American English functional name in master name data structure 109 and a German functional name in the German master name data structure 111. However, the same global identifier is associated with the damper control application object in the American English master name data structure 109 and in the German master name data structure 111.

Entries in the master name data structure 104 are also preferably divided into such exemplary categories as:

Object Attributes (e.g., Setpoint);

Object Classes (e.g., Analog Input, Schedule, Trend);

Object Attribute Strings (e.g., Degrees Fahrenheit or Celsius, On, Start, Emergency);

Applications (e.g., Temperature, Flow Control, Chilled Water Reset);

Control System Devices (e.g., Sensor, Network, Valve);

HVAC System Devices (e.g., Chiller, Air-handler);

Geographic (e.g., Floor, Room); and

Building System Devices (e.g., Lights, Smoke Detector, uninterruptible power supply). The arrangement of the entries in the master name data structure 104 allows the user to more effectively view the building automation data.

The preferred software environment of the present invention is an object-oriented environment wherein objects have methods and attributes to perform building automation control operations. Moreover, different views are associated with the objects in order to vary the degree of resolution of information associated with an object.

Master name data structure 104 associates global identifiers not only with software objects but also with the attributes, views, and commands of the objects. For example, the "single duct cooling only VAV" application object has a unique identifier as well as its attributes, such as, "maximum flow" rate and minimum flow" rate. Commands for that application object (which have unique global identifiers) include "enable" and "disable" commands to instruct the application respectively to execute or not to execute. Views for that application (which have unique identifiers) typically include a particular grouping of attributes. For example, a flow view displays to the user only those attributes which are related to the flow values of the application, such as, "maximum flow" rate and minimum flow" rate.

The German user selects at monitor 36A the language in which to view the data about the building environmental control system. The user in the United States selects at monitor 36B the language in which to view the data about the building environmental control system.

To obtain information from the building automation system, a user (such as German user at monitor 36A) invokes a building automation reporter 130 to view attributes and values. Since the possible selectable attributes of the building automation system were arranged by geographic location category (i.e., location within the building automation facility), the user can more quickly and efficiently select the German functional names of those attributes for which the user wishes to check the status. In this example, the German user wishes to view the attribute value of building automation application object 100 and accordingly selects the German functional name of the attribute.

A building automation master name processor 133 uses the German functional name (as selected by the German user) to obtain its unique global identifier from German master name data structure 111. The building automation master name processor 133 obtains the value of the attribute from building automation application object 100 using the global identifier. The obtained information is then translated from the global identifier to the German functional name for viewing by the German user at monitor 36A.

Likewise, a user in the United States can view the same information as the German user but in American English. In that situation, the American English master name data structure 109 is used to obtain the global identifier so that the correct attribute value can be retrieved for the selected American English functional name of the attribute.

In the preferred embodiment, a building automation master name processor 133 and a master name data structure 104 reside on each user's computer in order to view data in the viewer's own language. However, it should be understood that the present invention is not limited to the building automation master name processor 133 and the master name data structure 104 residing on each user's computer, but also includes having centralized computers with the building automation master name processor 133 and the master name data structure 104. In that implementation, the centralized computers would keep track of each user and in which language the user wishes to view the building automation data.

To effect changes to the names in the system, the entries in the master name data structure 104 are always updated first. All changes to the list are made by adding another entry to the bottom of a category. A revision level is maintained for the master name data structure. All users of the list (e.g., the German user and the USA user) are notified of any changes to the list.

A building automation application developer software module 142 can be used by both the German user and the USA user to construct facility specific applications. Although the USA user may construct new building automation applications using functional names from the American English master name data structure 109, the German user can still view and use the USA user's constructed applications since the underlying global identifiers are the same. These features significantly enhance the global distribution and use of new software applications.

Figure 3:
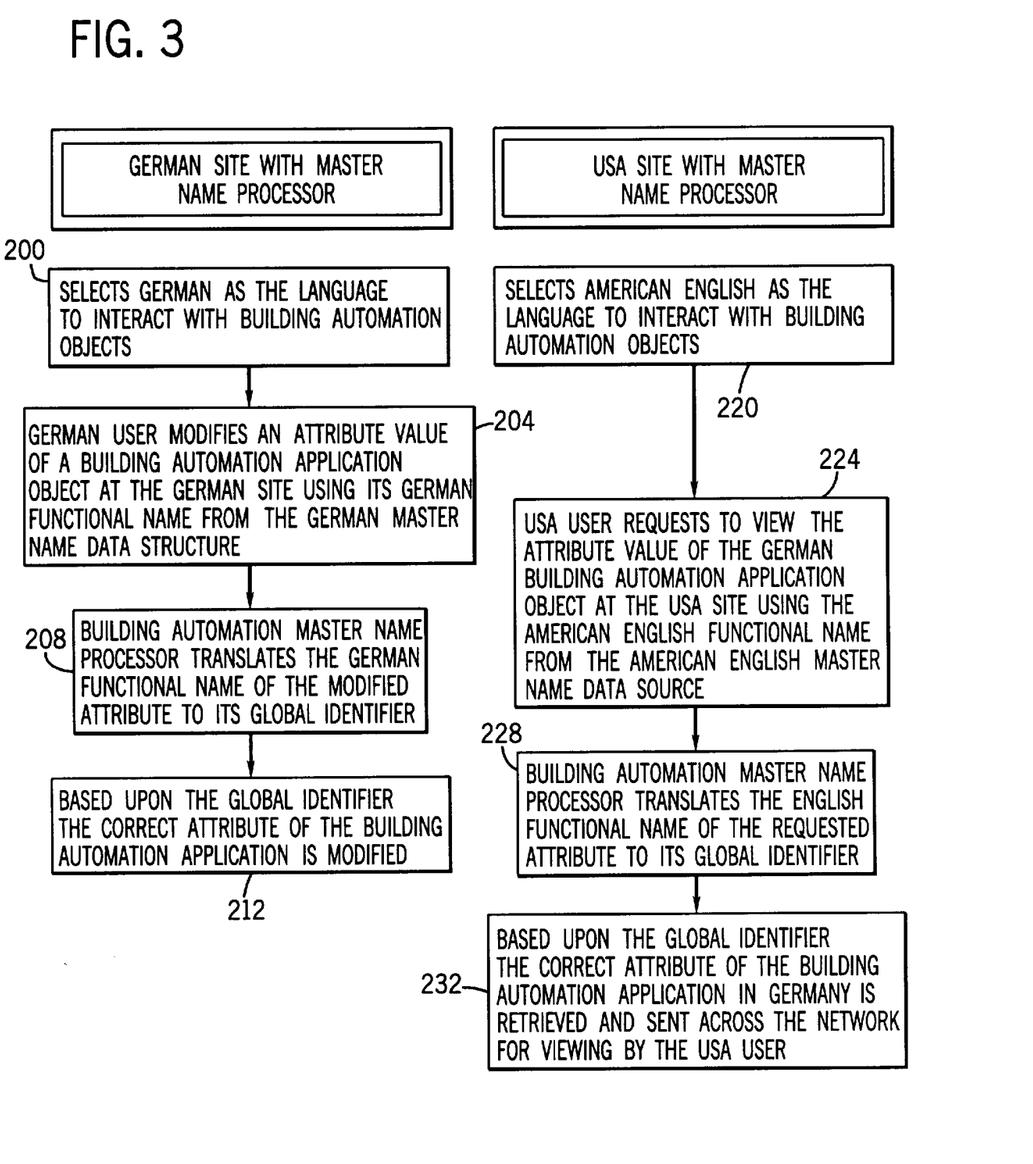
FIG. 3 is a flow chart depicting the operational steps for converting text from one location specific context to another location specific context.

FIG. 3 depicts an exemplary set of operational sequences for a German user and an USA user to interface with the same building automation information. At process block 200, the German user at the German site selects German as the language to interact with building automation objects. The German user modifies an attribute value of a building automation application object at the German site using its German functional name from the German master name data structure at process block 204.

At process block 208, the building automation master name process translates to the global identifier the German functional name of the attribute to be modified. The building automation application modifies the appropriate attribute based upon the global identifier at process block 212.

Likewise, an USA user wishes to interface with the same information as the German user. However, the USA user selects American English as the language to interact with the building automation objects at process block 220. At process block 224, the USA user uses the American English functional names from the American English master name data structure to select the attribute which has just been modified by the German user. At process block 228, the building automation master name processor translates the American English functional name of the requested attribute to its global identifier. Based upon the global identifier, the appropriate attribute of the building automation application in Germany is retrieved and sent across the network for viewing by the USA user.

Figure 4:
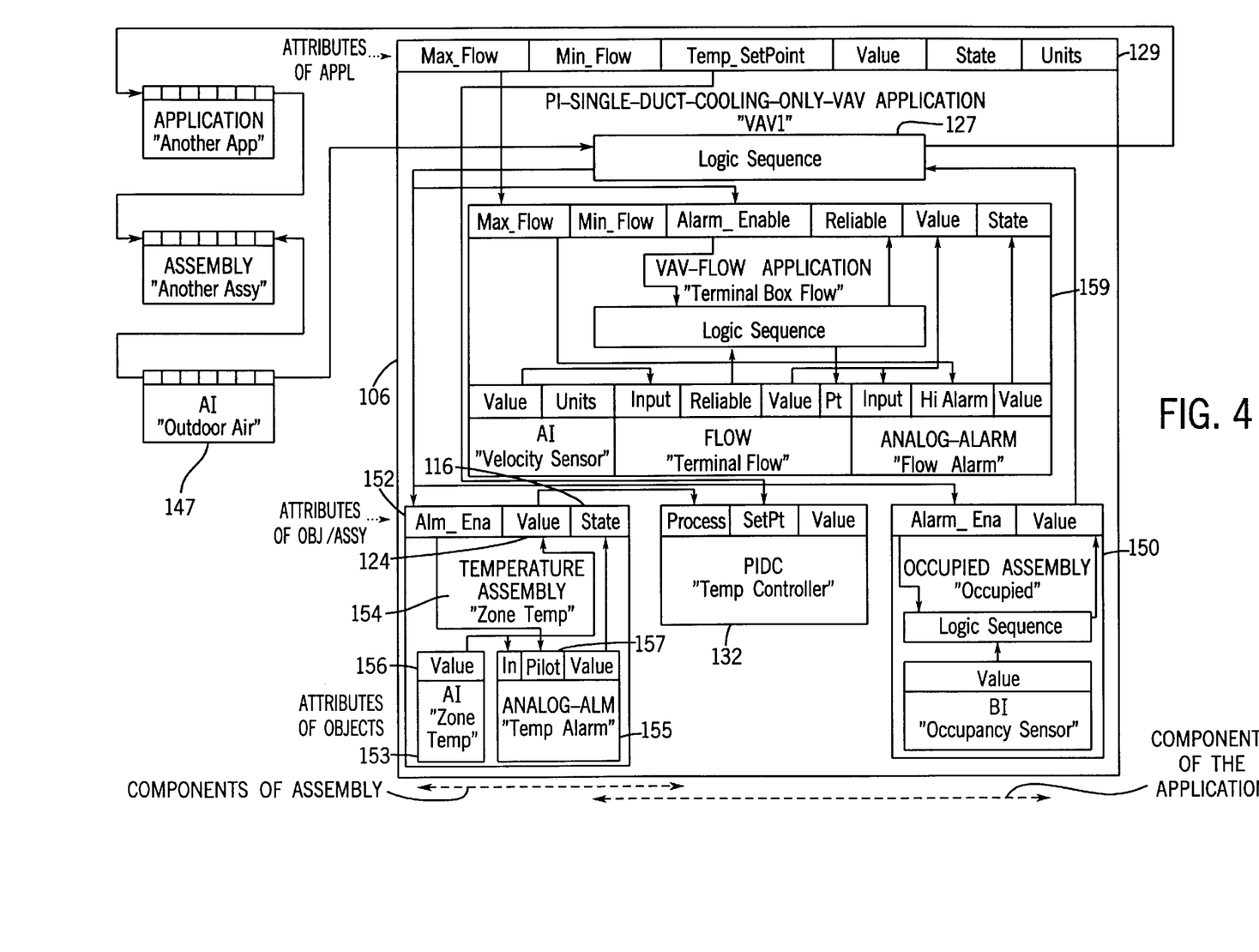
FIG. 4 is an object-oriented diagram illustrating the data and methods involved in an example having a duct space cooling space application object.

FIG. 4 depicts an exemplary set of building automation objects and associated attributes and commands. Each object, attribute and command have associated a unique global identifier so that users can view the same information in different languages. This figure illustrates how objects which have global identifiers are combined and interconnected to construct a building automation application.

For example, a VAV (variable air volume) control application object 106 uses the temperature of the outdoor air in order to control a single duct cooling VAV apparatus. The VAV control application object 106 obtains the temperature from the "AI (analog input) Outdoor Air" object" 147.

Within the VAV application, an Analog Input standard object 153 for detecting a zone temperature is combined with an Analog Alarm standard object 155 to form a Temperature assembly object 154. The VAV application 106 sets the Alarm Enabled attribute 152 of Temperature assembly object 154 which in turn is sets the Pilot attribute 157 associated with Analog Alarm object 155.

The Temperature value attribute 156 of Analog Input object 153 is interconnected as an input to Analog Alarm object 155 and Temperature assembly object 154. When the zone temperature value exceeds a threshold value established by Analog Alarm object 155, a State attribute 116 of Temperature assembly object 154 is set by Analog Alarm object 155. Temperature value attribute 124 and State attribute 116 of Temperature assembly object 154 can then be interconnected to other standard objects, assembly objects or application objects that comprise VAV application 106.

Temperature assembly object 154 is one of the standard software components comprising VAV application 106. A PID standard object 132, an Occupied assembly object 150 and a nested VAV Flow application object 159 are also embedded into VAV application 106. Like Temperature assembly 154, Occupied assembly 150 and VAV Flow application 159 are constructed from standard objects consisting of a Binary Input object, and an Analog Input object, a Flow object and an Analog Alarm object, respectively. In addition, to these standard objects, each of these assembly objects are also designed to include attributes and a logic sequence.

After creating each of these standard software components, a building automation application engineer can then define an attribute structure 129 and a logic sequence 127 that interconnects/interacts with each of these individual software components to provide VAV application 106. Typical applications, including rooftop unit control, air handling unit control, chiller plant control and fan coil control, would also be constructed from a set of standard objects in this manner for use in the building automation system of the present invention.

Figure 5:
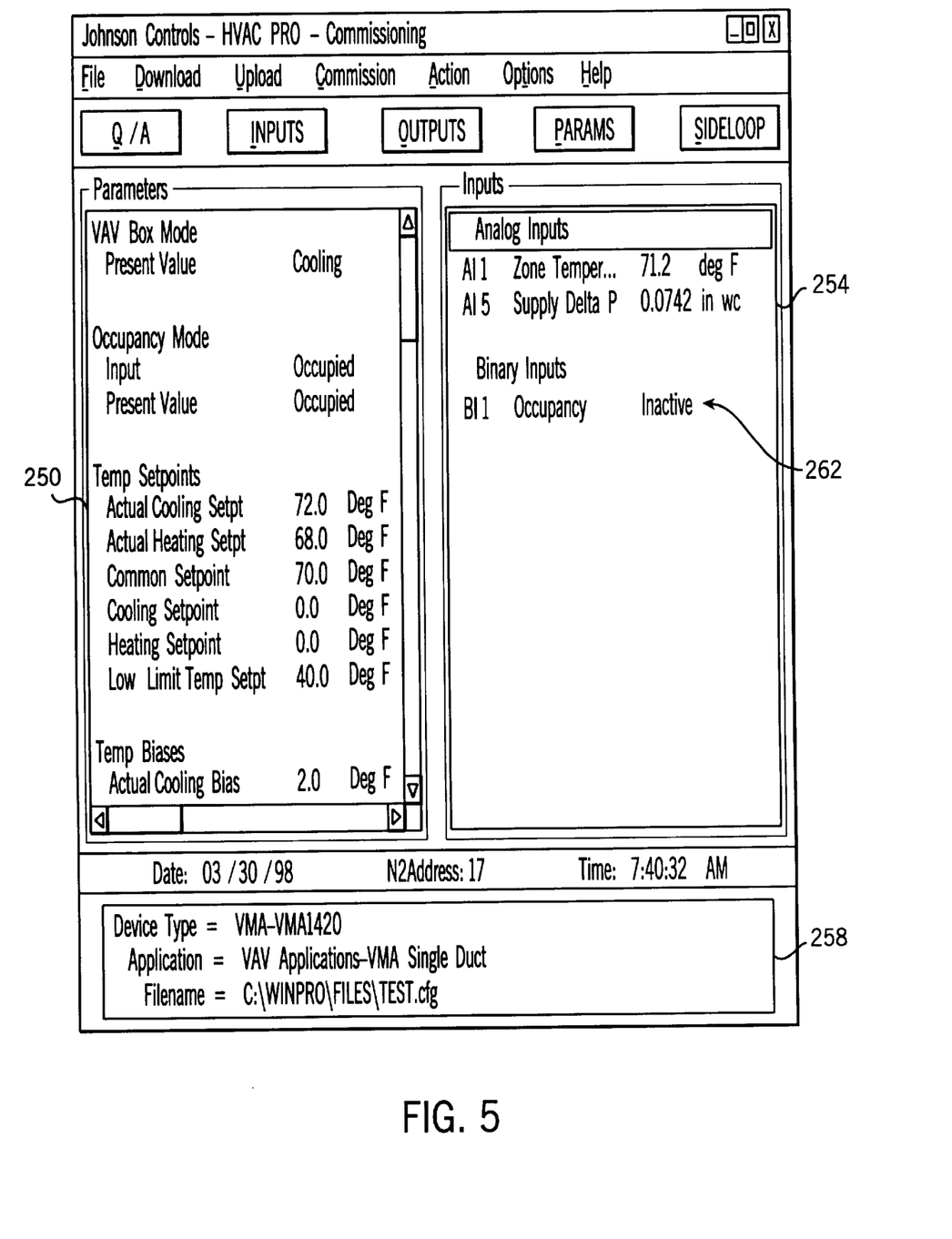
FIGS. 5 and 6 are screen displays respectively depicting Building Automation control values in English and German languages through the use of the present invention.
Figure 6:
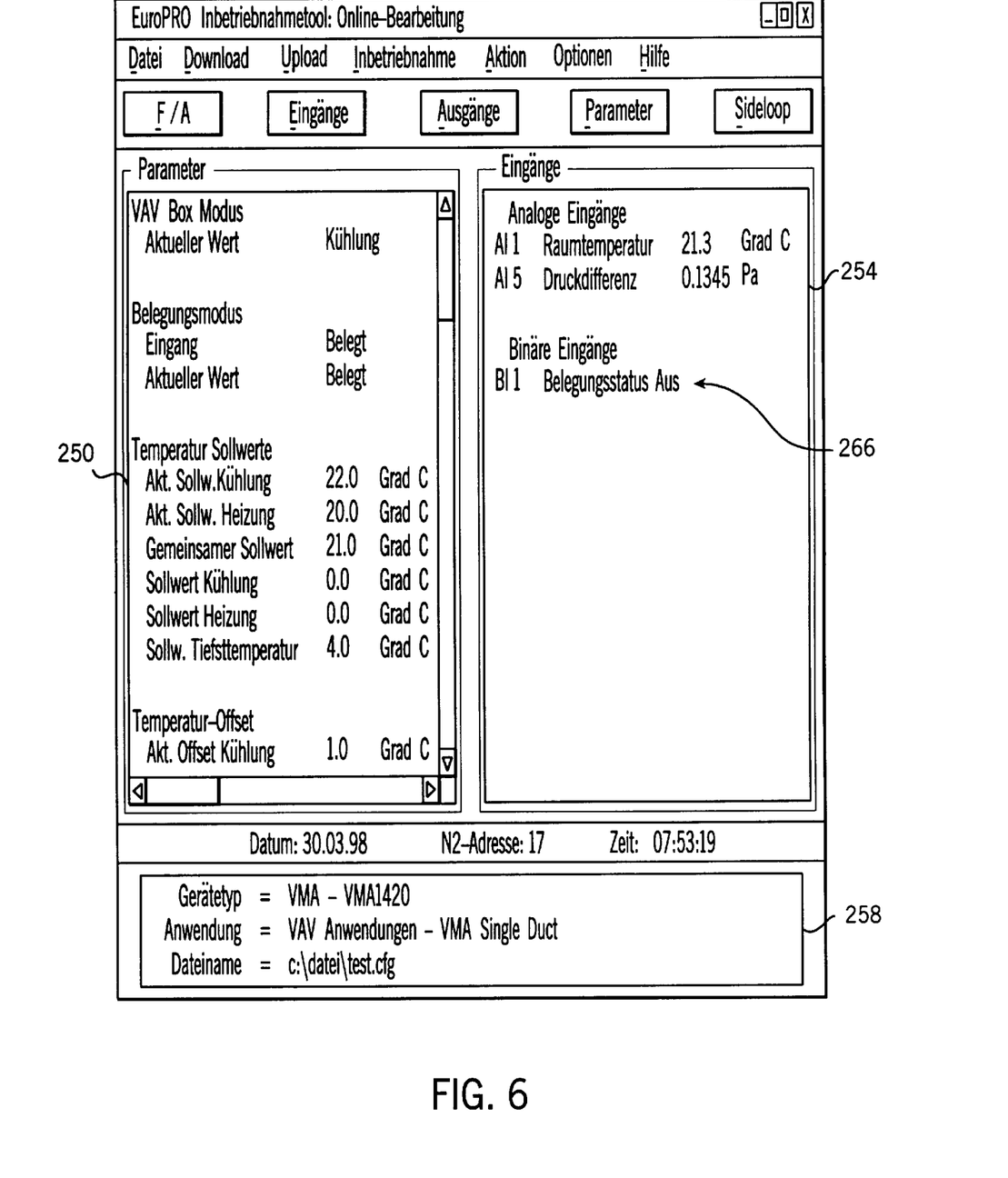

FIGS. 5 and 6 are screen displays respectively depicting Building Automation control values in English and German languages through the use of the present invention. FIG. 5 depicts parameter values 250 and input values 254 for the application shown by reference numeral 258: VAV Applications—VMA Single Duct. For example, reference numeral 262 depicts in English the binary input "Occupancy" with an "Inactive" value.

FIG. 6 depicts parameter values 250 and input values 254 for the same application but displayed in German through the teachings of the present invention. For example, reference numeral 266 depicts the German equivalent of the English binary input "Occupancy" and its "Inactive" value.

The embodiments which have been set forth above were for the purpose of illustration and were not intended to limit the invention. It will be appreciated by those skilled in the art that various changes and modifications may be made to the embodiments discussed in this specification without departing from the spirit and scope of the invention as defined by the appended claims.

We claim:

1. A computer-implemented building automation operating system for supporting applications that interact with building automation devices in different countries, comprising:

a computer-human interface for viewing data related to the applications;

a master name data structure for storing global identifiers and a plurality of country specific names for each of the applications that interact with the building automation devices, said global identifiers uniquely identifying the applications;

a building automation master name processor connected to said master name data structure and to said computer-human interface for providing to said computer-human interface a specific name based upon its associated global identifier.

2. The system of claim 1 wherein said master name data structure includes names specific to a plurality of countries.

3. The system of claim 2 further comprising:

a location selector for selecting the names specific to one of said plurality of countries.

4. The system of claim 1 wherein said country specific name is provided to said computer-human interface based upon a request from said computer-human interface.

5. The system of claim 4 wherein said computer-human interface is a building automation control computer-human interface.

6. The system of claim 1 wherein said master name data structure includes unique numbers to identify said applications.

7. The system of claim 6 wherein master name data structure includes associations between said unique numbers and said country specific names, said country specific names being provided to said computer-human interface based upon said associated unique numbers.

8. The system of claim 1 wherein the plurality of country specific names are in a plurality of human languages.

9. A computer-implemented building automation operating system for supporting applications that interact with building automation devices in different countries, comprising:

a computer-human interface for viewing data related to the applications;

a master name data structure for storing, for each of the applications, a unique global identifier and a plurality of names for the respective application wherein the plurality of names are in a plurality of human languages;

a selector for designating a particular human language;

a building automation master name processor connected to the master name data structure and to the selector for providing to the computer-human interface a specific name based upon its associated global identifier and the particular human language designated.

10. The system of claim 9 wherein the specific name is provided to the computer-human interface based upon a request from the computer-human interface.

11. The system of claim 10 wherein the computer-human interface is a building automation control computer-human interface.

12. The system of claim 9 wherein the master name data structure includes unique numbers to identify the applications.

13. The system of claim 12 wherein master name data structure includes associations between the unique numbers and the plurality of names, specific ones of the plurality of names being provided to the computer-human interface based upon the associated unique numbers and the designated human language.

* * * * *